W. B. KOUWENHOVEN & G. B. WILKINS.
DYNAMO ELECTRIC MACHINE.
APPLICATION FILED JUNE 8, 1910.
991,787.
Patented May 9, 1911.
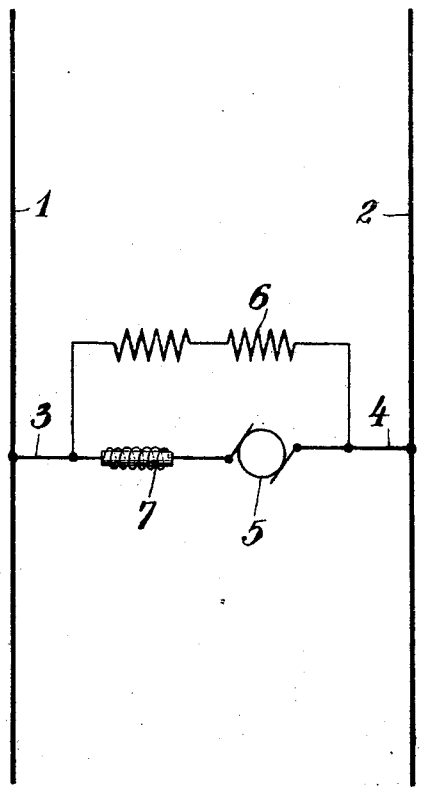

UNITED STATES PATENT OFFICE.

WILLIAM BENNETT KOUWENHOVEN AND GEORGE B. WILKINS, OF NEW YORK, N. Y.

DYNAMO-ELECTRIC MACHINE.

991,787.     Specification of Letters Patent.     Patented May 9, 1911.

Application filed June 8, 1910. Serial No. 565,781.

*To all whom it may concern:*

Be it known that we, WILLIAM B. KOUWENHOVEN, a citizen of the United States, residing at Brooklyn, county of Kings, city and State of New York, and GEORGE B. WILKINS, a citizen of the United States, residing at Morris Park, county of Queens, city and State of New York, have invented certain new and useful Improvements in Dynamo-Electric Machines, of which the following is a specification.

This invention relates to dynamo electric machines and has reference more particularly to direct-current, electric motors of the type employing a shunt field winding, that is, either shunt-motors or motors having a compound field winding.

The invention is directed to the provision of certain improvements in connection with motors of this type the object of which is to more effectually protect the motor from injury due to fluctuations of the line voltage.

The invention is of particular utility in connection with direct-current motors having a shunt field winding and used in electric railway circuits. Most of the electric railways in this country employ direct current, the voltage of which is supposed to be maintained constant at about 550 to 660 volts. It is well known, however, that this voltage is subject to wide fluctuations, particularly on large systems where the train loads are very heavy, and may often vary as much as 150 volts. In such systems it is very common to employ shunt-motors for various purposes in the power-plants, repair barns, shops and stations, as for instance in running elevators, pumps and the like, and in the operation of these motors, great difficulty has been experienced due to the effect of these pronounced changes of voltage occurring from time to time. As a result of such changes in the potential across the lines of a circuit, the armatures of the shunt-motors have been burned out and the commutators have been so injured as to result in the loss of the use of the motors for substantial periods and the necessity of making extensive repairs. Such fluctuation of the voltage of the system is believed to cause a high potential surging in the system and may lead to a high tension discharge from the field of the motor through the armature with consequent injury to the latter, for instantaneous voltages of over 1000 volts have been indicated by instruments in a circuit the normal voltage of which is but 650. Also, motors having shunt field windings are frequently used in driving machine tools such that the load comes on the motor suddenly and so heavily that the rotation of the armature is momentarily checked or even entirely stopped; when this occurs there follows a rush of current through the armature due to the cutting down of the counter-electro-motive force.

The present invention aims to provide means whereby the danger of injury to the motor in this way may be effectually guarded against.

It consists in the utilization of a choke-coil or inductance for obstructing the passage of momentary rushes of current and connecting this choke-coil in the armature circuit of the motor so that it will protect the motor both against a rise of voltage and a sudden rush of current resulting from such rise of voltage or from any other cause such as a fall of the counter electro-motive force.

The invention is illustrated in the accompanying drawing which shows the motor and the connections thereto diagrammatically.

The lines 1 and 2 indicate mains of a direct-current circuit, in which the voltage is normally maintained substantially constant, such as wires connected to the mains of a direct-current railway system operating at 650 volts. A shunt-motor is connected in circuit between the lines 1 and 2 by the wires 3 and 4, its armature being indicated at 5 and its field at 6. A choke-coil or inductance is shown at 7 connected in the armature circuit of the motor, that is, it is connected in series with the armature and it and the armature are connected in parallel with the field coils. As thus arranged, the choke-coil 7 will protect the armature 5 against injury resulting from a sudden and pronounced rise of voltage or a rush of current due to such a rise of voltage or to any other cause, such as a pronounced decline of the counter electro-motive force of the motor or a discharge from the field coils through the armature. This means for protecting a shunt-wound direct-current motor consisting in connecting a choke-coil in the armature circuit is one which is inexpensive to manufacture and readily installed and in practice it has been proven entirely effective.

Having described our invention, what we claim as new therein and desire to secure by Letters Patent of the United States is:

The combination with a direct-current circuit and a motor having a shunt field winding connected across the lines thereof, of means for protecting the motor consisting of a choke-coil connected in series with the armature of the motor and in parallel with said shunt field winding, substantially as set forth.

This specification signed and witnessed, this sixteenth day of May, 1910.

WILLIAM BENNETT KOUWENHOVEN.

Witnesses:
HERMAN LEHMAN,
CHAS. A. KENMORE.

This specification signed and witnessed, this 25th day of May, 1910.

GEORGE B. WILKINS.

Witnesses:
W. E. WILKINS,
S. W. KASCHER.

---

Copies of this patent may be obtained for five cents each, by addressing the "Commissioner of Patents. Washington, D. C."